(12) United States Patent
Tarnowski

(10) Patent No.: US 9,157,426 B2
(45) Date of Patent: Oct. 13, 2015

(54) OVERHEAT CONTROL MECHANISM FOR ELECTRICAL VACUUM PUMPS

(71) Applicant: Martin Tarnowski, Solingen (DE)

(72) Inventor: Martin Tarnowski, Solingen (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 393 days.

(21) Appl. No.: 13/623,146

(22) Filed: Sep. 20, 2012

(65) Prior Publication Data

US 2014/0079568 A1    Mar. 20, 2014

(51) Int. Cl.
*F04D 15/00* (2006.01)
*F04B 37/14* (2006.01)
*F04B 19/00* (2006.01)
*F16K 17/38* (2006.01)
*F04B 53/16* (2006.01)

(52) U.S. Cl.
CPC ............... *F04B 37/14* (2013.01); *F04B 19/00* (2013.01); *F04D 15/0005* (2013.01); *F16K 17/383* (2013.01); *F04B 53/16* (2013.01); *F05C 2251/00* (2013.01); *F05C 2253/00* (2013.01); *F05C 2253/24* (2013.01)

(58) Field of Classification Search
CPC ............................ F04D 15/0005; F16K 17/383
USPC .................................... 417/306; 137/72, 74
See application file for complete search history.

(56) References Cited

U.S. PATENT DOCUMENTS

| 1,898,897 | A | * | 2/1933 | Rowley ........................ 137/72 |
| 2,573,983 | A | * | 11/1951 | Ofeldt ........................ 137/74 |
| 3,270,675 | A | * | 9/1966 | Ajam ........................ 417/292 |
| 5,634,847 | A | * | 6/1997 | Shea ........................ 454/342 |
| 5,733,104 | A | * | 3/1998 | Conrad et al. ........... 417/44.1 |
| 2008/0283010 | A1 | * | 11/2008 | Bohner et al. ........... 123/90.17 |

* cited by examiner

*Primary Examiner* — Charles Freay
*Assistant Examiner* — Christopher Bobish
(74) *Attorney, Agent, or Firm* — Joseph E. Root

(57) ABSTRACT

A vacuum pump connected to a unit where a low pressure is desired to be maintained, is adapted to reduce a rise in its temperature, during extended operations of the pump. A suction channel has a first end connected to a suction port of the pump and a second end connected to the unit. An aperture provided on the suction channel extends to a pre-determined depth with the channel. The aperture is plugged by a fusible material, or a material capable of subliming. As the temperature of the pump rises, the suction channel transfers heat to the plugging layer of the aperture, and the layer melts or sublimes gradually, with the temperature rise. Once the layer has completely melted or sublimed, the apertures aspirate ambient air from the surroundings into the pump, which cools the interior components of the pump, and quickly reduces the pump's temperature.

14 Claims, 3 Drawing Sheets

OVERHEAT CONTROL MECHANISM FOR ELECTRICAL VACUUM PUMPS

BACKGROUND

Vane pumps are widely used in many devices and systems, for creating low pressure within a desired region. These pumps have a variety of applications in the automotive industry; for example, in supercharging, braking assistance, and steering mechanisms. By continuously sucking the air from the desired region, these pumps create low pressure within the region. Typical examples of such vane pumps include rotary vane pumps and variable displacement vane pumps.

Many of the vane pumps are driven electrically, by coupling them to a power supply source. When used in vehicles, the vane pumps are generally controlled by an electronic control unit, which switches the pump on and off based on certain conditions. For example, when a vehicle is found to be in stationary state, the control unit may switch off the vane pump, and restart the pump when the vehicle starts moving again, or in a case where vacuum is specifically requested. Further, certain control units control operations of the vane pumps by identifying the state of the engine of the vehicle. For example, if the vehicle's engine is turned off or a specific vacuum level is achieved, the control unit generates signals for switching off the pump.

During continuous operations of a vane pump for an extended period of time, the pump may develop an undesirably high temperature within its internal components. This may affect the operations and functionality of the pump. The high temperature may result from the current flowing through the brushes of the pump (if the pump is electrically driven), friction in the vanes, and other causes, including radiation of heat from the combustion engine. In addition, if there is a defect in the electronic control unit coupled to the pump, the pump may be left turned on during undesirable moments, such as, when the engine is turned off, or the vehicle is stationary.

The mechanical components of a pump may get destroyed if the pump's temperature rises beyond a certain limit during operations. In such cases, the pump needs to be replaced by an expert personal, resulting in unnecessary expenses and interruptions in use of the device/system wherein the pump is used.

Cooling mechanisms are sometimes employed within pumps to address this issue. However, in many cases, even with such conventional cooling mechanisms, it is difficult to control the temperature of the interior components of the pump.

Therefore, considering the aforementioned problems, there exists a need for cooling a pump in cases where the temperature of the pump rises beyond a specific limit.

SUMMARY

The present disclosure describes a mechanism for reducing the temperature of a vacuum pump, when the temperature of the vacuum pump rises beyond a limit, during unexpected and unintended operations of the pump, to avoid the destruction of the pump.

In one aspect, the present disclosure provides a vacuum pump adapted to reduce rise in temperature of its internal components, during continuous operations of the pump. The pump includes multiple suction ports, and a number of suction channels connected to the suction ports. Specifically, each suction channel has a first end connected to a unit in which a low pressure is desired to be maintained, and a second end connected to one of the suction ports. Further, the suction channels have one or more apertures provided on their outer surface. Each aperture is plugged by a layer made of either a fusible material, or a material capable of subliming. The material of the layer has a melting point or a sublimation point lower than a pre-determined temperature, depending on whether the material is fusible, or is capable of subliming, respectively. Further, a non-return valve is disposed within each suction channel, upstream of the vacuum pump, between the suction port and the outlet of the unit which is connected to the suction channel. The unit may be a brake servo unit for a vehicle.

During operations of the pump, when its temperature rises beyond a specific limit, the plugging layer for the apertures melts or sublimes, and this facilitates the pump to aspirate ambient air from the surroundings. The ambient air extracts heat from the heated components of the pump, and reduces their temperature in a very short time.

Additional aspects, advantages, features and objects of the present disclosure would be made apparent from the drawings and the detailed description of the illustrative embodiments construed in conjunction with the appended claims that follow.

DETAILED DESCRIPTION OF ILLUSTRATIVE EMBODIMENTS

The following detailed description illustrates aspects of the disclosure and the ways it can be implemented. However, the description does not define or limit the invention, such definition or limitation being solely contained in the claims appended thereto. Although the best mode of carrying out the invention has been disclosed, those in the art would recognize that other embodiments for carrying out or practicing the invention are also possible.

Vacuum pumps are widely used for creating a low pressure within a specific region. These devices work by extracting gas molecules from a sealed volume, to create a partial vacuum within the volume. A typical example of a vacuum pump is a rotary vane pump. This pump is a positive displacement pump, which consists of vanes mounted over a rotor that rotates within a cavity. The vanes can be of variable/fixed length, and are tensioned to maintain contact with the pump's walls as the pump rotates. Vane pumps are widely used in automotive industry, for providing braking assistance in many large trucks and passenger cars.

During continuous operations of a vane vacuum pump for a long period, many factors may lead to development of a high temperature within the pump's internal components and the walls. As aforementioned, such factors may include the current flowing within its brushes, friction within the vanes, etc. Generally, an electronic control unit is coupled to these pumps, for switching on or switching off the pumps. For example, when the engine of the vehicle is running, or the vehicle is moving and vacuum is desired, the control unit may keep the pump switched on, and on identifying that the vehicle is stationary, the engine is switched off, or a desired vacuum level has been achieved, the control unit may switch off the pump. However, if the electronic control unit fails, the pump may be kept turned on even if the vehicle is stationary or the engine has been switched off. This may be another reason for a rise in temperature of the pump beyond an undesirable limit. If the rise in temperature is not controlled, then the pump's mechanical components can get damaged, and this may call for a replacement/repair of the pump. Further, during repairing, the pump needs to be disintegrated from the entire assembly, and taken to a workshop, which is both financially expensive and time consuming.

The present disclosure provides an efficient mechanism for controlling the temperature of a vacuum pump, during operations of the pump. The pump is adapted to reduce its temperature automatically, if the temperature rises beyond a specific limit during longer operations of the pump, and the permanent damage of the pump is avoided even in cases of its unintended excessive operations.

Figure 1:
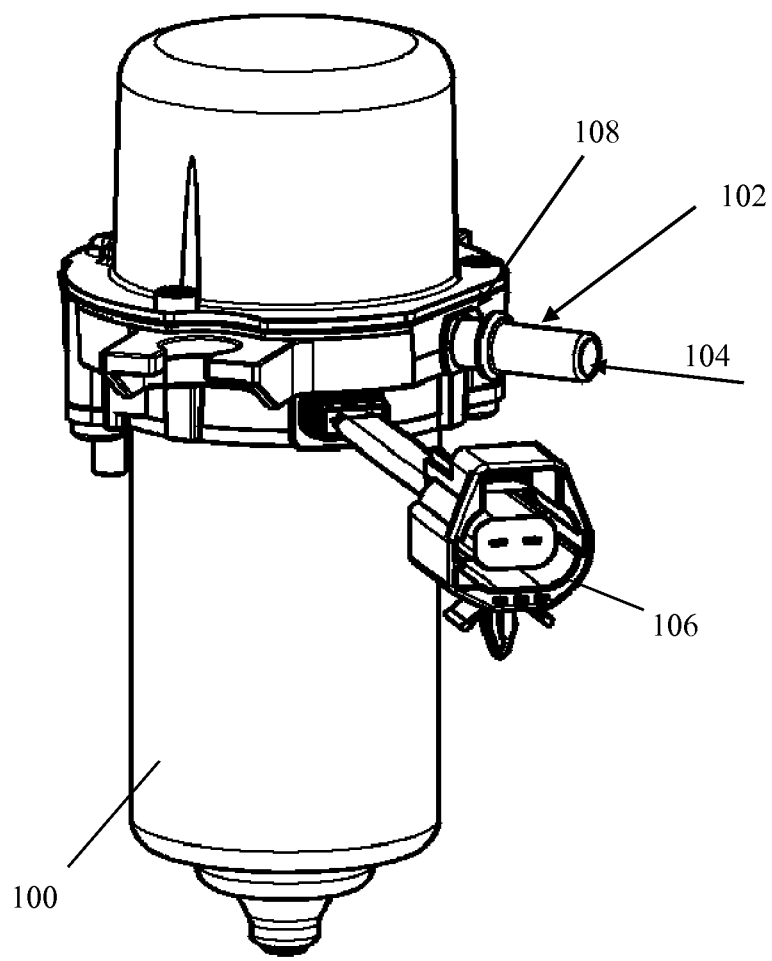
FIG. 1 illustrates a perspective view of a vacuum pump, with the overheat control mechanism of the present disclosure incorporated therein, in accordance with the present disclosure.

FIG. 1 shows a perspective view of a vacuum pump, adapted to reduce rise in temperature of its interior component beyond a specific limit. As shown, the vacuum pump 100 has a suction channel 102 connecting the pump to a unit (not shown) wherein a low pressure is desired to be maintained. The unit may be any appropriate unit, including, for example, a brake servo unit of a vehicle. To create a low pressure within the unit, the pump 100 sucks the gas molecules from the unit through the suction channel 102, along the direction indicated by the arrow 104, into the suction chamber of the pump. Though only one suction channel has been shown, there can be multiple suction channels for sucking air from the unit. The vacuum pump 100 is electrically driven through an electronic control unit (not shown herein), which is coupled to the pump through an electrical connection 106. The electronic control unit selectively switches on or switches off the pump, based on certain identifications. For example, if the vehicle is stationary, or the engine of the vehicle is kept turned off, then the control unit may switch off the pump, and if the vehicle is moving or the engine is on, the pump may be switched on.

A connecting line (not shown) connects the suction channel 102 to the unit where a negative pressure is desired to be maintained. The connecting line may be in the form of a hose or a conduit having one end connected to the unit, and another end connected to the suction channel 102. A non-return valve (not shown) is disposed downstream of the unit, and upstream of the pump 100, preferably within the connecting line. The non-return valve prevents back flow of the air sucked by the pump 100, into the unit. Any appropriate conventionally known non-return valve may be used, for example, a ball valve, a swing check valve, a lift-type non-return valve, etc. An aperture 108 is provided within the suction channel 102, just ahead of the suction inlet of the pump 100. The aperture 108 is disposed on the outer surface of the suction channel 102, and extends to a pre-determined depth within the suction channel 102. The cross-section of the aperture 108 and the depth till which it extends within the suction channel 102 can vary, depending on the dimensions of the suction channel 102. Though shown as being of a circular cross-section, the aperture 108 can be also of an elliptical, ovular or rectangular cross-section. Further, the aperture 108 is plugged by a layer of a fusible material or a material capable of subliming. Any suitable material which can melt or sublime at a specific pre-determined temperature can be used for this purpose, thus, not limiting the scope of the present disclosure. In a preferred embodiment, the layer may be composed of a plastic material. For example, the layer may be made of a synthetic resin or a natural resin. Typically, due to longer operations of the pump, its temperature may reach at high values of about 220° C., and this may destroy the mechanical components of the pump 100. For this reason, the melting or sublimation point of the material composing the covering layer of the aperture 108 is about 160° C. in a preferred embodiment. However, those in the art will understand that the melting/sublimation point may also differ substantially, depending on the temperature beyond which the interior components of the pump 100 are vulnerable to being destroyed. Specifically, the melting/sublimation point of the material is sufficiently lower than the temperature above which the pump 100 is prone to be functionally affected. Further, though only one aperture 108 is shown, multiple apertures may be provided on the outer surface of the suction line 102. The number of apertures 108 may depend on the size and capacity of the pump 100. Typically, for a pump having a capacity of about 3-4 liters, one or two apertures 108 may be sufficient to accomplish the objective of the present disclosure.

The advantage of plugging the aperture 108 with a layer of a fusible material, or a material capable of subliming, is now explained. Specifically, since the layer plugging the aperture 108 is thermally reactive, an increase in the temperature of the pump beyond a specific limit makes the material of the layer reach its melting or sublimation point, depending on whether the material is fusible, or is capable of subliming. Eventually, the aperture 108 opens, and is able to suck ambient air from the surroundings. The aspirated ambient air exchanges heat with the heated interior components of the pump 100, and brings their temperature down in a few seconds. Typically, the time taken to cool down the components of the pump may vary between 1-2 minutes, depending on the size of the pump. Those in the art will understand that as the aperture 108 opens, the pump automatically aspirates ambient air into it, due to the pressure difference between the inner region of the suction channel 102, and the surroundings. Once the pump 100 has cooled down to a sufficiently low temperature, it can be taken to a workshop and the opened aperture 102 can be plugged again with a fusible or sublimating material, since the previous layer covering the aperture has substantially melted or sublimated. This restores the functionally operative state of the pump 100, facilitates its reuse, and avoids its replacement.

Figure 2:
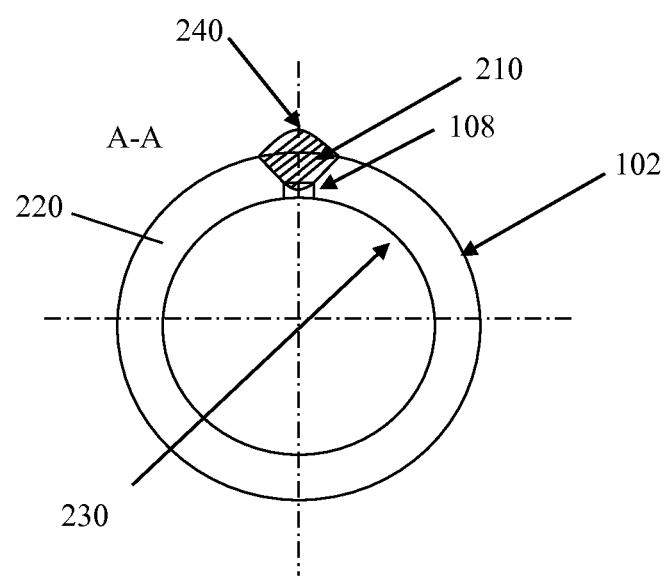
FIG. 2 illustrates a cross-sectional view of a portion of the suction channel of the vacuum pump of FIG. 1, where an aperture is disposed for facilitating and enhancing heat dissipation through the pump, in accordance with the present disclosure.

FIG. 2 shows a cross-sectional view of the suction channel 102 of FIG. 1, along the region where the suction channel 102 has the aperture 108 disposed over its outer surface. As shown, the aperture 108 is a bore of cylindrical cross-section, extending within the region 220, till a depth reaching the inner surface 230 of the suction channel 102. A layer 210 of a fusible material, or a material capable of subliming, covers the aperture 108. The layer 210 preferably extends till the outer surface of the suction channel 102. During longer operations, as the temperature of the pump rises, the layer 210 melts or sublimates as the material of the layer reaches its melting or sublimation point. If the material of the layer 210 is fusible, then some quantity of melted material may flow into the interior of the suction channel 102, which, however, does not obstruct the functionality of the pump. The material deposited within the interior of the suction channel 102 can be easily removed later. Moreover, as aforementioned, the melting or sublimation point of the material of the layer 210 is below a pre-determined critical temperature. In a preferred embodiment, since a temperature above 200° C. can destroy the interior components of the pump, the melting or sublimation point is kept within a range of 160° C.-165° C. However, variations can exist in the melting/sublimation point of the chosen material for the layer 210, depending on the thermal tolerance of the pump.

Once the layer 210 has melted or sublimated, the pump can be taken to a workshop, for closing the aperture 108 with a similar or different fusible material, or a material capable of subliming, to reinstate the operating condition of the pump.

In an embodiment, the layer 210 is applied in the form of a plug 240, as shown. The plug 240 does not extend beneath the inner surface 230 of the suction channel 102 in any case. Further, though being shown in the shape of a rhomboid, the plug 240 can also be a conical layer, a cylindrical layer, etc., thus, not limiting the scope of the present disclosure.

The suction channel 102 is made of an appropriate conducting material, so that it can easily transfer heat to the layer 210 as the temperature of the pump rises. This facilitates melting/sublimation of the layer 210 with the rise in temperature of the pump, and allows ambient air to enter and exchange heat with the interior components of the pump.

Figure 3:
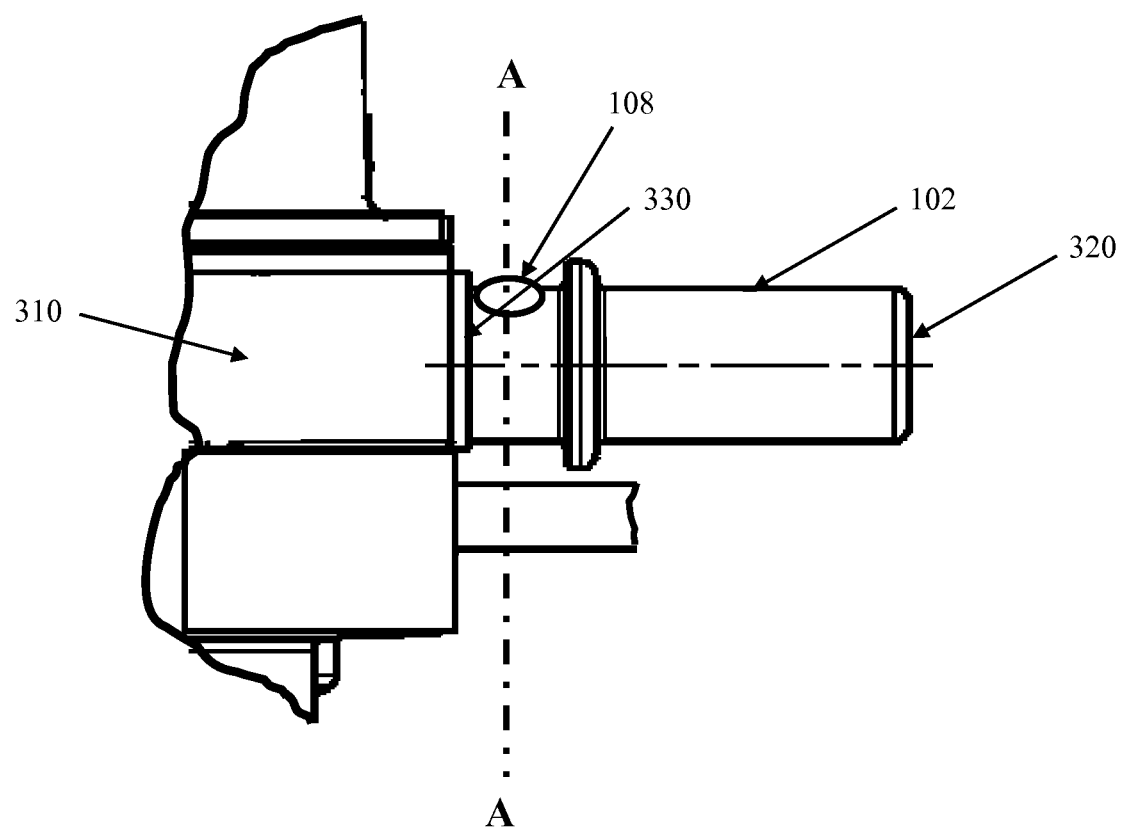
FIG. 3 illustrates a sectional view of the vacuum pump, along the region surrounding the suction channel of the vacuum pump, in accordance with the present disclosure.

FIG. 3 illustrates a sectional view of the vacuum pump 100 of FIG. 1, along the region surrounding the suction channel of the pump. The suction channel 102 has a suction inlet 320 connected to the brake unit of the vehicle. Air sucked from the unit is routed through the suction channel 102 and leads into the interior portion 310 of the pump. Specifically, the suction channel 102 is fused into a suction port 330 of the pump, to facilitate influx of the air sucked through the suction channel, into the pump. The aperture 108, as shown, is provided on the outer surface of the suction channel 102. Though shown as being opened, a layer of a fusible material, or a material capable of subliming, is applied to the aperture 108, as aforementioned, to cover the aperture, before operating the pump.

The overheat control mechanism for the vacuum pump, as disclosed herein, prevents the pump from damaging due to temperature rise, and hence, avoids the need of pump replacement.

Although the overheat control mechanism of the present disclosure has been specifically described in context of an electrically driven vane vacuum pump, the mechanism can also be implemented in other conventional pumps, thus, not limiting the scope of its application. Further, though illustrated through a typical example where the vacuum pump is connected to a brake unit of a vehicle, the vacuum pump may also be connected to any other unit where a negative pressure is desired to be maintained.

Although the current invention has been described comprehensively, in considerable details to cover the possible aspects and embodiments, those skilled in the art would recognize that other versions of the invention are also possible.

What is claimed is:

1. A vacuum pump, comprising:
   at least one suction port; and
   one or more suction channels, tubular in form, each suction channel having
   a first end connected to the suction port, and a second end adapted to be connected to a location requiring an application of suction, and
   at least one cylindrical aperture formed through a wall of each suction channel, the aperture being plugged by a layer of one of a fusible material or a material capable of subliming, the layer being applied to an exterior surface of the suction channel.

2. The vacuum pump of claim 1, wherein the layer is composed of a fusible material having a melting point lower than a pre-determined temperature.

3. The vacuum pump of claim 2, wherein the pre-determined temperature is lower than a maximum temperature attainable by the vacuum pump in an operational state of the pump.

4. The vacuum pump of claim 1, wherein the layer is composed of a material capable of subliming, and having a sublimation point lower than a pre-determined temperature.

5. The vacuum pump of claim 4, wherein the pre-determined temperature is lower than a maximum temperature attainable by the vacuum pump in an operational state of the pump.

6. The vacuum pump of claim 1, including a non-return valve positioned within each suction channel, upstream the vacuum pump, between the suction port and an outlet of the vacuum pump.

7. The vacuum pump of claim 6, wherein each aperture is provided on a surface of the suction channel at a location between the non-return valve and the suction port.

8. The vacuum pump of claim 1, wherein the unit is a brake servo unit of a vehicle.

9. The vacuum pump of claim 1, wherein the vacuum pump is operatively mounted in an automotive vehicle having an engine, the vacuum pump including an electronic control unit for switching on or switching off the vacuum pump, based on one of an operating condition of the vehicle's engine and a state of motion of the vehicle.

10. The vacuum pump of claim 1, wherein each aperture has a cross-section substantially smaller than a cross-section of the suction channels.

11. The vacuum pump of claim 1, wherein each aperture has one of a circular, an elliptical, a rectangular and an ovular cross-section.

12. The vacuum pump of claim 1, wherein each aperture is plugged by a layer of a plastic material.

13. The vacuum pump of claim 1, wherein the layer is made of a fusible material and the pump is configured to aspirate ambient air therein, through each aperture, and to thermally communicate with the ambient air, in response to melting of the layer.

14. The vacuum pump of claim 1, wherein the layer is made of a material capable of subliming, and the pump is configured to facilitate flow of ambient air therein, through each aperture, and to thermally communicate with the ambient air, in response to sublimation of the layer.

* * * * *